US010726645B2

(12) United States Patent
Khalifeh et al.

(10) Patent No.: US 10,726,645 B2
(45) Date of Patent: Jul. 28, 2020

(54) VEHICLE DIAGNOSTIC OPERATION

(71) Applicant: Ford Global Technologies, LLC, Dearborn, MI (US)

(72) Inventors: Ahmad Khalifeh, Austin, TX (US); Amy Beth Cronin, Westfield, MI (US); Scott J. Lauffer, Northville, MI (US); Rashmi Hegde, Royal Oak, MI (US); Beni Tang, Ann Arbor, MI (US); Ray C. Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 241 days.

(21) Appl. No.: 15/898,412

(22) Filed: Feb. 16, 2018

(65) Prior Publication Data
US 2019/0259226 A1  Aug. 22, 2019

(51) Int. Cl.
*G07C 5/08* (2006.01)
*G05D 1/00* (2006.01)

(52) U.S. Cl.
CPC ......... *G07C 5/0808* (2013.01); *G05D 1/0088* (2013.01); *G07C 5/0841* (2013.01)

(58) Field of Classification Search
CPC ... G07C 5/0808; G07C 5/0841; G05D 1/0088
See application file for complete search history.

(56) References Cited

U.S. PATENT DOCUMENTS

| | | | |
|---|---|---|---|
| 5,410,304 A | 4/1995 | Hahn et al. | |
| 6,330,499 B1 | 12/2001 | Chou et al. | |
| 6,351,709 B2 | 2/2002 | King et al. | |
| 6,438,491 B1 | 8/2002 | Farmer | |
| 7,239,946 B2 | 7/2007 | Sowa | |
| 7,486,802 B2 | 2/2009 | Hougen | |
| 7,502,718 B2 | 3/2009 | Kanamaru | |
| 7,908,060 B2 | 3/2011 | Basson et al. | |
| 8,019,501 B2 | 9/2011 | Breed | |
| 8,099,308 B2 | 1/2012 | Uyeke | |
| 8,190,355 B2 | 5/2012 | Emam et al. | |
| 8,392,111 B2 | 3/2013 | Ryu et al. | |
| 8,498,776 B2 | 7/2013 | Singh et al. | |
| 8,751,154 B2 | 6/2014 | Zhang et al. | |
| 8,825,270 B2 | 9/2014 | Chen | |

(Continued)

FOREIGN PATENT DOCUMENTS

| | | | |
|---|---|---|---|
| CN | 101446830 A | 6/2009 | |
| CN | 102752360 A | 10/2012 | |

(Continued)

OTHER PUBLICATIONS

"Smarter Car—A System and Method for Detecting and Alerting to Vehicle Blind Spots", ip.com, http://priorart.ip.com/IPCOM/000242877, Aug. 26, 2015.

(Continued)

*Primary Examiner* — Hussein Elchanti

(74) *Attorney, Agent, or Firm* — Frank A. MacKenzie

(57) ABSTRACT

A system includes means for identifying a risk condition based on a diagnostic trouble code (DTC) and an operating condition in a vehicle, means for determining an instruction for the vehicle based on the identified risk condition, and means for navigating the vehicle based on the instruction.

12 Claims, 4 Drawing Sheets

(56) References Cited

U.S. PATENT DOCUMENTS

| | | |
|---|---|---|
| 8,849,496 B2 | 9/2014 | Miyamoto et al. |
| 8,874,267 B1 | 10/2014 | Dolgov et al. |
| 8,874,305 B2 | 10/2014 | Dolgov et al. |
| 8,874,360 B2 | 10/2014 | Klinger et al. |
| 8,924,067 B2 | 12/2014 | Halder et al. |
| 8,924,071 B2 | 12/2014 | Stanek et al. |
| 8,977,424 B2 | 3/2015 | Ishimaru et al. |
| 8,996,235 B2 | 3/2015 | Singh et al. |
| 9,157,752 B1 | 10/2015 | Fernandez Garcia et al. |
| 9,224,053 B1 | 12/2015 | Ferguson et al. |
| 9,346,400 B2 | 5/2016 | Allard et al. |
| 9,368,026 B1 | 6/2016 | Herbach et al. |
| 9,442,487 B1 | 9/2016 | Ferguson et al. |
| 9,481,367 B1 | 11/2016 | Gordon et al. |
| 9,487,212 B1 | 11/2016 | Adam et al. |
| 9,523,984 B1 | 12/2016 | Herbach et al. |
| 9,529,361 B2 | 12/2016 | You et al. |
| 9,710,975 B2 | 7/2017 | Jefferies et al. |
| 9,805,423 B1 | 10/2017 | Konrardy et al. |
| 9,841,767 B1 | 12/2017 | Hayward |
| 9,903,728 B2 | 2/2018 | Powers et al. |
| 9,940,761 B2 | 4/2018 | Kundu et al. |
| 10,049,505 B1* | 8/2018 | Harvey .................. G07C 5/008 |
| 10,054,947 B2 | 8/2018 | Mays |
| 10,083,547 B1 | 9/2018 | Tomatsu |
| 10,086,782 B1 | 10/2018 | Konrardy et al. |
| 2002/0193923 A1* | 12/2002 | Toyama .................. B60S 5/00 701/29.3 |
| 2004/0193334 A1 | 9/2004 | Carlsson et al. |
| 2004/0217852 A1* | 11/2004 | Kolls .................. B60R 25/04 340/439 |
| 2008/0082221 A1 | 4/2008 | Nagy |
| 2008/0084283 A1 | 4/2008 | Kalik |
| 2008/0161987 A1 | 7/2008 | Breed |
| 2010/0205132 A1 | 8/2010 | Taguchi |
| 2010/0228419 A1 | 9/2010 | Lee et al. |
| 2010/0332121 A1 | 12/2010 | Okude et al. |
| 2011/0050461 A1 | 3/2011 | Pixley et al. |
| 2012/0083959 A1* | 4/2012 | Dolgov ................ G05D 1/0214 701/23 |
| 2012/0123951 A1* | 5/2012 | Hyatt .................. G06Q 10/10 705/305 |
| 2013/0238170 A1 | 9/2013 | Kinger |
| 2014/0136045 A1 | 5/2014 | Zhu et al. |
| 2014/0309806 A1 | 10/2014 | Ricci |
| 2014/0358353 A1 | 12/2014 | Ibanez-Guzman et al. |
| 2015/0149021 A1 | 5/2015 | Duncan et al. |
| 2015/0178998 A1 | 6/2015 | Attard et al. |
| 2015/0203112 A1 | 7/2015 | Duncan et al. |
| 2015/0203113 A1 | 7/2015 | Duncan et al. |
| 2015/0235480 A1 | 8/2015 | Cudak et al. |
| 2015/0241225 A1 | 8/2015 | Liu et al. |
| 2015/0348335 A1 | 12/2015 | Ramanujam |
| 2016/0009295 A1 | 1/2016 | Chun et al. |
| 2016/0147226 A1 | 5/2016 | Akselrod et al. |
| 2017/0032585 A1* | 2/2017 | Stenneth ................ G07C 5/008 |
| 2017/0039785 A1 | 2/2017 | Richter et al. |
| 2017/0072967 A1 | 3/2017 | Fendt et al. |
| 2017/0090480 A1 | 3/2017 | Ho et al. |
| 2017/0169628 A1 | 6/2017 | Schroeder et al. |
| 2017/0274901 A1 | 9/2017 | Herbach et al. |
| 2017/0277607 A1 | 9/2017 | Samii et al. |
| 2017/0341575 A1 | 11/2017 | Hauler |
| 2017/0357859 A1 | 12/2017 | Jain et al. |
| 2017/0372431 A1 | 12/2017 | Perl et al. |
| 2018/0003515 A1 | 1/2018 | Saru et al. |
| 2018/0037112 A1 | 2/2018 | Otake |
| 2018/0046182 A1 | 2/2018 | Joyce et al. |
| 2018/0052463 A1 | 2/2018 | Mays |
| 2018/0059687 A1 | 3/2018 | Hayes et al. |
| 2018/0080777 A1 | 3/2018 | Nimchuk et al. |
| 2018/0081374 A1 | 3/2018 | Nimchuk et al. |
| 2018/0082383 A1 | 3/2018 | Bogovich et al. |
| 2018/0268695 A1 | 9/2018 | Agnew et al. |
| 2018/0365902 A1 | 12/2018 | Tomatsu |
| 2019/0001941 A1 | 1/2019 | Westlund et al. |
| 2019/0056735 A1 | 2/2019 | Koopman et al. |
| 2019/0079513 A1 | 3/2019 | Greenfield et al. |

FOREIGN PATENT DOCUMENTS

| | | |
|---|---|---|
| CN | 105867351 A | 8/2016 |
| CN | 104169976 B | 5/2017 |
| CN | 103632211 B | 6/2017 |
| JP | 2009187424 A | 8/2009 |
| JP | 5022272 B2 | 9/2012 |
| JP | 201781382 A | 5/2017 |
| WO | 2014148976 A | 9/2014 |

OTHER PUBLICATIONS

Non-Final Office Action dated Apr. 4, 2018; U.S. Appl. No. 15/236,780, filed Aug. 15, 2016.

UK Search Report dated Dec. 6, 2017 re GB Appl. 1712796.0.

Non-final Office Action dated Apr. 18, 2019 re U.S. Appl. No. 15/326,780, filed Aug. 15, 2016.

Non-final Office Action dated Aug. 8, 2019 re U.S. Appl. No. 15/792,029.

Final Office Action dated Oct. 5, 2018 re U.S. Appl. No. 15/236,780, filed Aug. 15, 2016.

* cited by examiner

VEHICLE DIAGNOSTIC OPERATION

BACKGROUND

A vehicle component such as an actuator, sensor, controller, etc., may fail to operate, which may impair or prevent a vehicle operation. Vehicle computers may perform diagnostic operation to detect a fault or failure of a vehicle component. A vehicle computer may also be programmed to operate the vehicle, e.g., in an autonomous mode, however once a fault is detected it is a problem to determine whether and how to operate the vehicle.

DETAILED DESCRIPTION

Introduction

Figure 1:
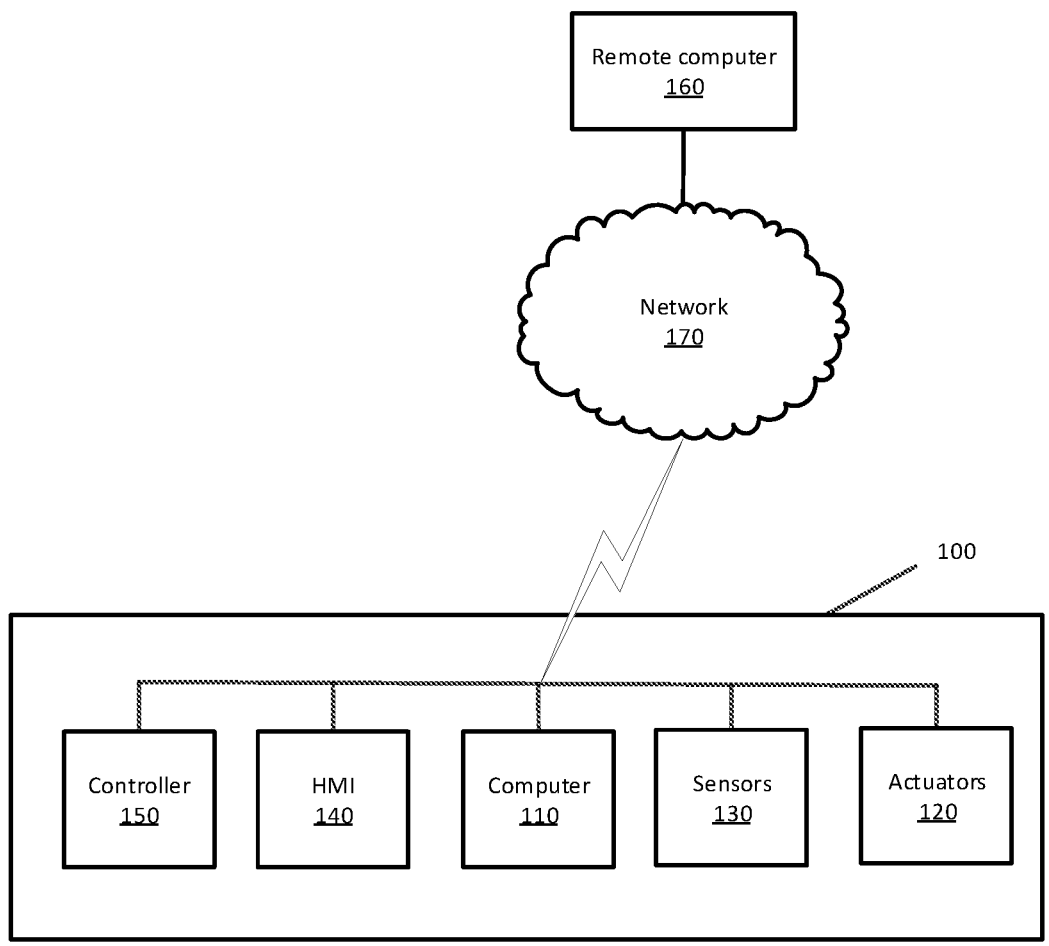
FIG. 1 is a diagram of an exemplary vehicle system.

Disclosed herein is a system including means for identifying a risk condition based on a diagnostic trouble code (DTC) and an operating condition in a vehicle, means for determining an instruction for the vehicle based on the identified risk condition, and means for navigating the vehicle based on the instruction.

The determined instruction may include at least one of planning a route to a service station, canceling a next trip, navigating the vehicle to a nearest road side, and stopping the vehicle in a current lane.

The means for identifying the risk condition may further include means for determining an expected time to address the risk condition based on the identified risk condition.

The system may further include means for updating the risk condition based on a second DTC, and means for updating the instruction based on the updated risk condition.

The system may further include means for determining an updated expected time to address the risk condition, wherein the updated expected time to address the risk condition is a lowest of a first expected time to address the risk condition associated with the DTC and a second expected time to address the risk condition associated with the second DTC.

The means for identifying the risk condition may include a vehicle computer, and the means for determining the instruction includes a remote computer wirelessly communicating with the vehicle computer.

The means for navigating the vehicle may be a vehicle computer.

The system may further include means for determining the vehicle operating condition based on data received from at least one of a vehicle speed sensor, a camera sensor, and an acceleration sensor.

The vehicle operating condition may further include an outside temperature, a precipitation rate, and a road surface condition.

The system may further include means for determining the risk condition based at least in part on a table including a plurality of relationships between (i) the risk condition, and (ii) the DTC and the vehicle operating condition.

The system may further include means for dispatching a second vehicle to a location of the vehicle based on the risk condition of the vehicle.

The system may further include means for determining the risk condition based on the vehicle operating condition and a plurality of vehicle operating thresholds including at least one of a temperature threshold, a speed threshold, and an acceleration threshold.

Further disclosed herein is a system including a processor and a memory. The memory stores instructions executable by the processor to identify a risk condition based on a diagnostic trouble code (DTC) and an operating condition in a vehicle, to determine an instruction for the vehicle based on the identified risk condition, and to navigate the vehicle based on the instruction.

The determined instruction may include at least one of planning a route to a service station, canceling a next trip, navigating the vehicle to a nearest road side, and stopping the vehicle in a current lane.

The instructions to identify the risk condition may further include determining an expected time to address the risk condition based on the identified risk condition.

The instructions may include further instructions to determine the vehicle operating condition based on data received from at least one of a vehicle speed sensor, a camera sensor, an acceleration sensor, an outside temperature, a precipitation rate, and a road surface condition.

The instructions may include further instructions to determine the risk condition based at least in part on a table including a plurality of relationships between (i) the risk condition, and (ii) the DTC and the vehicle operating condition.

Further disclosed herein is a method including identifying a risk condition based on a diagnostic trouble code (DTC) and an operating condition in a vehicle, determining an instruction for the vehicle based on the identified risk condition, and navigating the vehicle based on the instruction.

The method may further include determining the vehicle operating condition based on data received from at least one of a vehicle speed sensor, a camera sensor, an acceleration sensor, an outside temperature, a precipitation rate, and a road surface condition.

The method may further include determining the risk condition, based at least in part on, a table including a plurality of relationships between (i) the risk condition, and (ii) the DTC and the vehicle operating condition.

Further disclosed is a computing device programmed to execute any of the above method steps. Yet further disclosed is a vehicle comprising the computing device.

Yet further disclosed is a computer program product, comprising a computer readable medium storing instructions executable by a computer processor, to execute any of the above method steps.

System Elements

FIG. 1 is a block diagram of a vehicle 100. The vehicle 100 may be powered in a variety of known ways, e.g., with an electric motor and/or internal combustion engine. The vehicle 100 may include computer(s) 110, actuator(s) 120, sensor(s) 130, controller(s) 150, and a human machine interface (HMI 140), each of which are discussed in more detail below.

The computer 110 includes a processor and a memory such as are known. The memory includes one or more forms of computer-readable media, and stores instructions executable by the computer 110 for performing various operations, including as disclosed herein.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may operate a vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers 150 or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers 150, actuators 120, sensors 130, etc. Alternatively or additionally, in cases where the computer 110 actually comprises multiple devices, the vehicle communication network may be used for communications between devices represented as the computer 110 in this disclosure. Further, as mentioned below, various controllers 150 and/or sensors 130 may provide data to the computer 110 via the vehicle communication network.

In addition, the computer 110 may be configured for communicating through a wireless communication interface with a remote computer 160 via a wireless communication network 170. The communication network may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

Sensors 130 may include a variety of devices known to provide data via the vehicle communications bus, a private communication bus, automotive Ethernet, FPD-Link III, LIN (local interconnect network), Maxim-GMSL2, or hardwired analog connection. For example, the sensors 130 may include one or more cameras, radars, and/or Light Detection and Ranging (LIDAR) sensors disposed in the vehicle 100 providing data encompassing at least some of the vehicle interior and/or exterior.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, steering, interior lighting, exterior lighting, horn, etc. of the vehicle 100. The control signals used to control the actuators 120 may be generated by the computer 110, a control unit located in the vehicle 100, e.g., the brake controller 150, etc. The vehicle 100 may include various components or sub-systems, each including one or more sensors 130, actuators 120, controllers 150, etc. For example, the vehicle 100 may include a brake component including brake sensors 130, brake actuators 120, and/or other electronic, mechanical, etc. elements that stop the vehicle 100 based on commands received from a controller 150. As another example, the vehicle 100 may include a powertrain component or subsystem that may include one or more actuators 120, sensors 130, etc., in addition to an engine, electric motor, and/or a transmission.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such as a touchscreen display, a smart phone, external displays, etc., for receiving information from a user and/or output information to the user.

A vehicle 100 component, e.g., an actuator 120, a sensor 130, an HMI 140, an electronic controller 150 included in a component, etc., may have a fault. A fault is a condition in which a component fails to operate, or operates outside of one or more predefined parameters, e.g., a predefined parameter could be a physical quantity such as temperature, torque, revolutions per minute, pressure, etc. Thus, operating outside a predefined parameter could include the vehicle 100 and/or a component not operating, operating above, and/or below a specified value or range, e.g., above a specified wheel speed, outside a specified temperature range, etc. The vehicle 100 computer 110 may be programmed to determine whether a vehicle 100 component, e.g., a propulsion, braking, steering, etc., is in a fault condition based on data received from, e.g., various vehicle 100 sensors 130, actuators 120, controllers 150, etc. For example, a fault can be determined by a diagnostic operation, i.e., the computer 110 may be programmed to monitor a vehicle 100 component and determine whether a fault condition has occurred, e.g., whether a physical quantity is outside a predefined range.

The computer 110 and/or controllers 150 may periodically communicate with one another. For example, a brake controller 150 may periodically transmit a status message including operating information of the brake controller 150 to the computer 110. A failure to receive a periodic message may be identified as a fault condition in a vehicle 100. The computer 110 may be programmed to determine whether an expected message from, e.g., a controller 150, a second computer 110, etc., is missing, i.e., has not been received, upon determining that the message was not received within an expected time, e.g., 100 milliseconds (ms), since activating a vehicle 100 ignition, and/or since previously received message. Upon determining that a message from, e.g., a brake controller 150, is missing, the computer 110 may store a DTC (Diagnostic Trouble Code), e.g., labeled "no communication with the brake controller 150," in a computer 110 memory.

In one example, during an operation of the vehicle 100 in an autonomous mode, the computer 110 may be programmed to actuate one or more controllers 150 to transmit the diagnostic data periodically and/or upon a determined change, e.g., of a DTC status from an inactive state to an active state. In other words, this process may be referred to as "polling." Thus, advantageously, a time to detect a fault condition in the vehicle 100 computer 110 may be reduced compared to only periodic transmission of diagnostic data, e.g., DTC status.

The computer 110 and/or any of vehicle 100 controllers 150 may be programmed to perform a diagnostic operation by verifying whether a fault condition is met. For example, a minimum output torque may be expected from an engine after the engine reaches a threshold temperature. The fault condition may be "the engine torque output is less than the expected torque threshold." The diagnostic operation may further include updating a diagnostic status upon determining that a fault condition is met and/or a previously met fault condition is resolved, i.e., the fault condition does not exist anymore, e.g., a deficient vehicle 100 part was replaced.

The diagnostic operation may further include recording the diagnostic status, e.g., in a computer 110 memory. Each diagnostic operation may be identified by a diagnostic trouble code (DTC) which is typically a unique numeric code specifying a particular fault condition that the computer 110 may receive via a vehicle 100 network such as a Controller Area Network (CAN communications bus. It is to be understood that DTCs are discussed herein by way of example and not limitation; other fault identifiers or descriptors could be used in the context of the present disclosure. A vehicle 100 computer 110 may be programmed to perform various diagnostic operations associated with various vehicle 100 components. A status of a DTC typically includes one of "active", or "inactive." Additionally or alternatively, the status of a DTC may include other states such as "currently inactive and previously recorded", etc. "Active" means the DTC is recorded. "Inactive" means the DTC is not recorded (e.g., no deficiency was determined or a recorded deficiency was erased from the computer 110 memory), whereas "inactive but previously recorded" means a deficiency was determined and recorded, although currently the deficiency is not active. The computer 110 and/or a controller 150 may be programmed to update and store a diagnostic status associated with each of the diagnostic operations in a computer 110 memory and/or transmit the diagnostic status via the vehicle 100 communication network to another computer, e.g., a diagnostic tester. Each DTC typically identifies a fault condition of a specific vehicle 100 component, e.g., associated with vehicle 100 propulsion, steering, braking, etc.

As discussed above, the computer 110 may be programmed to perform various diagnostic operations (e.g., resulting in setting a status of one or more DTCs), each associated with one or more of vehicle 100 components and/or operations. A diagnostic condition may be specified based on a specific vehicle 100 component. For example, each of the controllers 150 may be programmed to perform diagnostic operation(s) associated with the operation of the respective controller 150. The computer 110 may be programmed to receive status data of DTCs from the controllers 150, e.g., via the vehicle 100 communication network.

As discussed above, a fault condition may impair and/or prevent a vehicle 100 operation and/or a controller 150 operation. The vehicle 100 computer 110, a remote computer 160, and/or a combination thereof, can be programmed to identify a risk condition based on a diagnostic trouble code (DTC) and an operating condition in the vehicle 100, to determine an instruction for the vehicle 100 based on the identified risk condition, and to navigate the vehicle 100 based on the instruction.

In the present disclosure, an "operating condition" is a set of a plurality of data that specifies vehicle 100 physical parameters including speed, acceleration, yaw rate, vibration, etc., and possibly also data pertaining to vehicle 100 environment such as weather data including precipitation rate, outside temperature, road surface condition, etc., and/or vehicle 100 route data including road elevation, road slope, etc. In one example, the vehicle 100 computer 110 may receive data pertaining to vehicle 100 operation condition from the vehicle 100 sensors 130, e.g., a speed sensor 130, a camera sensor 130, an acceleration sensor 130, etc., and/or the remote computer 160. The vehicle 100 computer 110 may be programmed to transmit operating condition data, e.g., the vehicle 100 sensor 130 data, via a wireless communication network 170 to the remote computer 160.

A risk condition or a "minimal risk condition" (MRC) as discussed herein specifies a plurality of one or more restrictions on one or more of vehicle 100 operations in accordance to one or more of fault conditions, e.g., DTCs with currently active status, DTCs previously with active status, etc. In other words, the MRC specifies what measures should be applied in order to contain or minimize a risk that can be resulted from a fault condition in the vehicle 100. A risk may for example include a likelihood of a vehicle 100 impact with another vehicle, a likelihood of a loss of control over vehicle 100 operation, e.g., lack of braking operation, etc. A restriction in the present context includes at least one of (i) limiting a range of a value associated with a physical attribute of the vehicle 100, e.g., limiting vehicle 100 speed to less than 30 kilometers per hour (kph), (ii) enabling, disabling, and/or configuring a vehicle 100 operating mode, e.g., disabling a vehicle 100 autonomous mode, and (iii) applying limitations on vehicle 100 routing, e.g., geofencing, rerouting, pulling over to a roadside, etc. Each of the restrictions are discussed below with respect to Tables 1-2.

An MRC may be identified by an identifier, e.g., "$MRC_1$", "$MRC_2$", and "$MRC_3$," as shown in Table 1. A fault condition, e.g., an active DTC, may make one or more vehicle 100 operations impaired or unavailable. Thus, an MRC may be identified based on available vehicle 100 operation(s). Table 1 shows an example association of available vehicle 100 operation(s) for respective MRCs. A fault condition severity may specify to what extent a fault condition impairs (or makes unavailable) vehicle 100 operation(s). The fault severity may be determined in an example scale of "low", "medium", and "high." For example, when under a fault condition, vehicle 100 propulsion, steering, and/or braking are available, then the fault condition severity is classified as "low." For example, when a fault condition causes a loss of propulsion, but steering and braking are available, the severity is classified as "medium," whereas when both propulsion and steering are unavailable, the severity is classified as "high." Additionally or alternatively, a fault condition severity may be classified in a numeric unit such as a percentage, e.g., 0% (zero) as lowest severity and 100% as a highest severity level and/or defined with other associations to available vehicle 100 operation(s).

Table 1 shows example MRCs ($MRC_1$, $MRC_2$, and $MRC_3$) associated with each of the fault condition severity levels. As discussed above, each MRC imposes restrictions to vehicle 100 operations and/or additional actions, e.g., data collection, indication to other road users, etc. $MRC_1$ is associated with fault condition(s), in which basic vehicle 100 operation to navigate a vehicle 100, e.g., propulsion, braking, and/or steering, are available. It is to be understood that MRCs are discussed herein by way of example and not limitation; other identifiers or descriptors could be used in the context of the present disclosure. Table 1 shows examples of different fault conditions associated with each MRC. For example, a multimedia fault condition which does not impair any of vehicle 100 propulsion, steering, braking, and lighting, may be associated to $MRC_1$.

TABLE 1

|  | $MRC_1$ | $MRC_2$ | $MRC_3$ |
|---|---|---|---|
| Expected time to address MRC | Upon return to terminal | 120 seconds | 20 seconds |
| Fault condition severity | Low | Medium | High |
| Available vehicle operations | Propulsion Braking Steering Lighting | Braking Steering Hazard lights Signal lights | Braking Hazard lights |
| Restrictions | Routing to terminal upon completion of current trip Potentially limiting Speed and/or acceleration Data collection | Navigation to nearest side of the road to stop Data collection | Stop at current lane Data collection |
| Example | Multimedia fault condition | Loss of propulsion operation | Loss of steering operation |

As shown in Table 1, each MRC can be associated with an expected time to address the respective MRC. The expected time to address the MRC is a maximum time threshold for fulfilling the restrictions of a MRC after the MRC is identified based on the detected fault condition. The computer 110 may be programmed to determine the expected time to address the risk condition based on the identified risk condition, e.g., based on a table such as Table 1 stored in the computer 110 memory.

Table 1 shows example restrictions associated with each of the MRCs. As discussed below with reference to Table 2, the vehicle 100 computer 110 and/or the remote computer 160 may be programmed to operate the vehicle 100 based on the MRCs, i.e., based on the restrictions imposed by the associated MRC.

TABLE 2

| No | Fault condition | Vehicle operating condition | Associated MRC |
|---|---|---|---|
| 1 | Steering controller fault condition | None | $MRC_3$ |
| 2 | Loss of anti-lock braking system operation | Temperature > 7 degrees Celsius | $MRC_2$ |
| 3 | Loss of anti-lock braking system operation | Temperature < 7 degrees Celsius or slippery road condition detected | $MRC_3$ |
| 4 | Brake signal plausibility fault | None | $MRC_1$ |
| 5 | Tail light malfunction | None | $MRC_1$ |

Table 2 shows example fault conditions of the vehicle 100. The computer 110 and/or the remote computer 160 may be programmed to determine the MRC based on, e.g., data such as shown in Table 2, including a plurality of relationships between (i) the MRCs, and (ii) the fault condition (e.g., DTC) and the vehicle 100 operating condition.

With reference to example number 1 of Table 2, the computer 110 may be programmed to detect a steering controller 150 fault condition, e.g., determined based on a steering controller 150 DTC, which results in a loss of vehicle 100 steering operation while propulsion and braking operation are available. Thus, the computer 110 may be programmed to determine the $MRC_3$ based on the determined fault condition.

As discussed above, the vehicle 100 operating conditions may include vehicle 100 sensor 130 data, data received from the remote computer 160, e.g., weather data, etc. The computer 110 may be programmed to determine the MRC based on the vehicle 100 operating condition and vehicle operating thresholds, e.g., a temperature threshold, a speed threshold, and/or an acceleration threshold. For example, with reference to example 2 of Table 2, the computer 110 may be programmed to determine $MRC_2$ based on the detected fault condition of an anti-lock braking system (ABS) and an outside temperature exceeding 7 degrees Celsius, whereas, referring to example 3, the computer 110 may be programmed to determine $MRC_3$ based on a same detected fault and a detected slippery road condition, e.g., based on vehicle 100 camera sensor 130 data. Examples 4 and 5 of Table 2 shows other examples of fault conditions which are associated with $MRC_1$ without considering vehicle 100 operating conditions.

With reference to FIG. 1, the computer 110, the remote computer 160 communicating with the computer 110, or a combination thereof may be programmed to identify the MRC. In the present disclosure, any programming discussed herein may be executable by the computer 110, the remote computer 160, and/or a combination thereof. The computer 110 may be programmed to identify one or more instructions based on the identified MRCs and to perform one or more actions based on the identified instructions. In one example, the remote computer 160 may be programmed to identify the instruction(s) and the computer 110 may be programmed to receive the instructions from the remote computer 160 and execute the actions based on the received instructions, e.g., actuating one or more vehicle 100 actuators 120. For example, the remote computer 160 may be programmed to receive information from another remote computer indicating a cybersecurity attack, to determine instructions based on the received information, and to transmit instructions to the vehicle 100.

As discussed above with reference to Table 1, a maximum expected time may be determined to address each MRC, e.g., 20 seconds for $MRC_3$. Thus, the identified instructions may be at least in part based on the maximum expected time to address the identified MRC. The computer 110 may be programmed to plan a vehicle 100 route to a service station, e.g., for a repair, to cancel a next trip of the vehicle 100, to navigate the vehicle 100 to a nearest road side, and/or to stop the vehicle 100 in a current lane. In one example, the computer 110 may be programmed to identify an instruction to stop the vehicle 100 in lane upon identifying an expected time, e.g., 20 seconds, to address an $MRC_3$. In another example, the computer 110 may be programmed to identify an instruction to navigate the vehicle 100 to a nearest side of the road and stop the vehicle 100 upon arriving on the side of the road based on an expected time, e.g., 120 seconds, to address a $MRC_2$. Additionally or alternatively, the computer 110 may be programmed to cancel a next trip of the vehicle 100 and/or to navigate the vehicle 100 to a service center upon identifying a $MRC_1$ with no limitations on expected time to address $MRC_1$.

Additionally or alternatively, the remote computer 160 may be programmed to dispatch a second vehicle to a location of the vehicle 100 based on the MRC of the vehicle 100. For example, the remote computer 160 may be programmed to dispatch a second vehicle to the vehicle 100 location upon identifying $MRC_2$ or $MRC_3$ for the vehicle 100 that causes a stoppage of the vehicle 100.

A vehicle 100 may have multiple fault conditions simultaneously. The computer 110 may be programmed to update the MRC of the vehicle 100 based on detecting a second DTC, and to update the instruction based on the updated MRC. The computer 110 may be programmed to update the MRC by identifying an MRC associated with each of the DTCs and to select the MRC associated with a higher severity. For example, upon detecting a second DTC which results in $MRC_3$ while a first DTC resulted in $MRC_2$, the computer 110 may be programmed to update the MRC associated with the vehicle to $MRC_3$. In another example, upon detecting a second DTC which results in $MRC_2$ while a first DTC resulted in $MRC_3$, the computer 110 may be programmed to maintain the MRC associated with the vehicle at $MRC_3$.

The computer 110 may be programmed to determine an updated expected time to address the MRC such that the updated expected time to address the risk condition is a lowest of a first expected time to address the risk condition associated with a first DTC and a second expected time to address the risk condition associated with the second DTC.

Processing

Figure 2A:
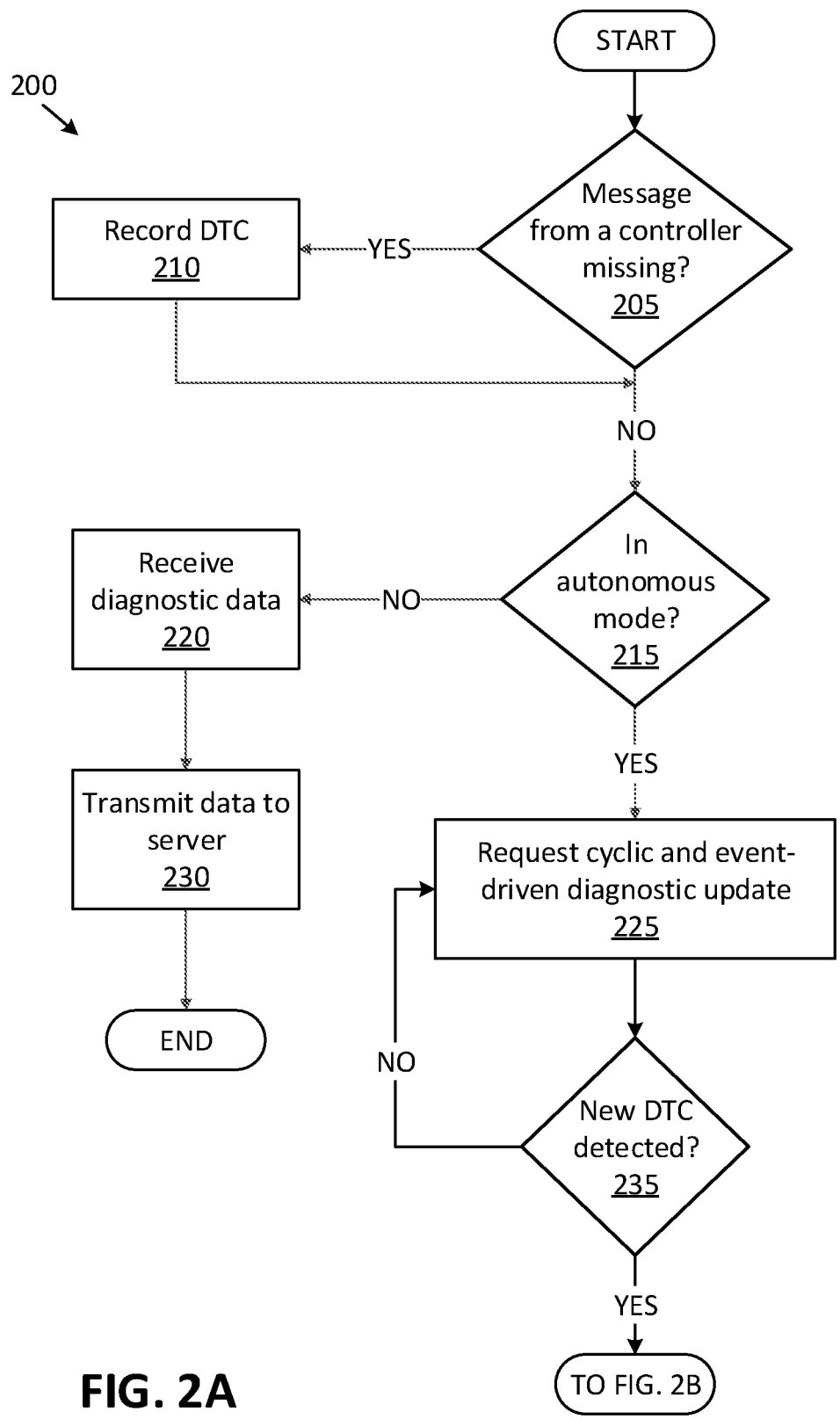
FIGS. 2A-2B are a flowchart of an exemplary process for controlling a vehicle with a fault condition.
Figure 2B:
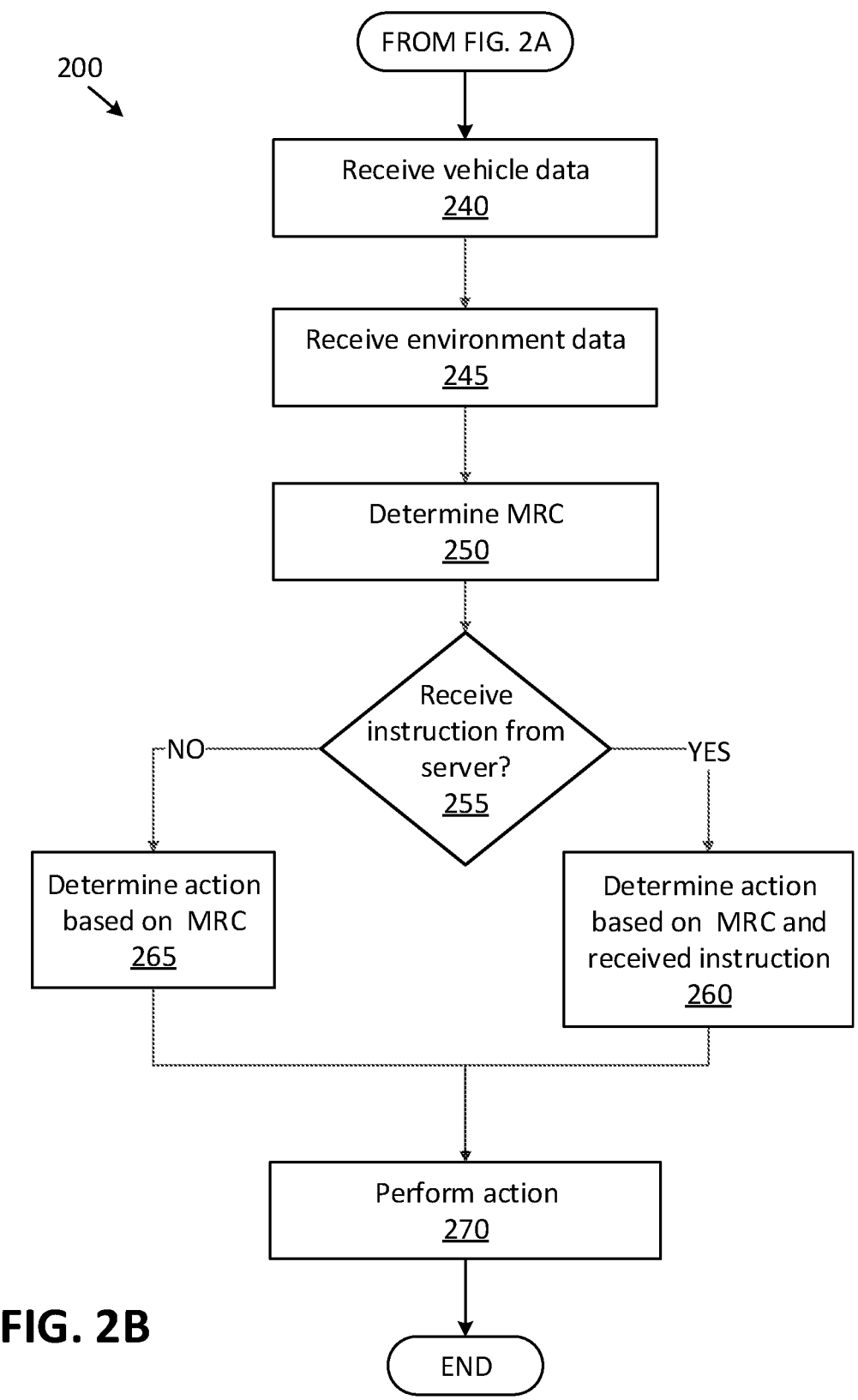

FIGS. 2A-2B are a flowchart of an exemplary process 200 for controlling a vehicle with a fault condition. The vehicle 100 computer 110 may be programmed to execute blocks of the process 200.

With reference to FIG. 2A, the process 200 begins in a decision block 205, in which the computer 110 determines whether a message from, e.g., a controller 150, a second computer 110, etc., is missing. If the computer 110 determines that a message is missing, then the process 200 proceeds to a block 210; otherwise the process 200 proceeds to a decision block 215.

In the block 210, the computer 110 records, e.g., in a computer 110 memory, a DTC based on the determined missing message. For example, the computer 110 memory may store a DTC indicating a fault condition of the controller 150 which is expected to transmit the missing message, e.g., via a vehicle 100 communication network. Following the block 210, the process 200 proceeds to the decision block 215.

In the decision block 215, the computer 110 determines whether the vehicle 100 is operated in an autonomous mode (i.e., whether a vehicle 100 autonomous mode is active). For example, the computer 110 could determine that it or another vehicle 100 computer 110 is presently operating each of the vehicle 100 propulsion, steering, and braking. If the computer 110 determines that the vehicle 100 is operated in the autonomous mode, then the process 200 proceeds to a block 225; otherwise the process 200 proceeds to a block 220.

In the block 220, the computer 110 receives diagnostic data, e.g., from controller(s) 150, other computers 110, etc. In one example, the computer 110 may receive status of each DTC of each controller 150 and/or other computer 110 via the vehicle 100 communication network.

Next, in a block 230, the computer 110 transmits the diagnostic data of the vehicle 100 to a remote computer 160, e.g., via a wireless communication network 170. Following the block 230, the process 200 ends, or alternatively returns to the decision block 205, although not shown in FIG. 2A.

In the block 225, the computer 110 requests periodic and/or event-driven diagnostic update. For example, the computer 110 may be programmed to actuate each of the vehicle 100 controllers 150 to transmit status of each of the DTCs periodically, e.g., each 50 ms, and/or upon any change, e.g., upon a change of status from inactive to active status.

Next, in a decision block 235, the computer 110 determines whether a new DTC is detected. In other words, the computer 110 determines whether a status of a DTC of a controller 150 and/or a DTC of the computer 110 has changed from inactive to active. If the computer 110 determines that a new DTC is detected, then the process 200 proceeds to a block 240 (see FIG. 2B); otherwise the process 200 returns to the decision block 225.

With reference to FIG. 2B, in the block 240, the computer 110 receives vehicle 100 data.

Next, in a block 245, the computer 110 receives environmental data.

Next, in a block 250, the computer 110 determines a MRC based on the received data. The computer 110 may be programmed to determine the MRC based on the detected DTC and the vehicle 100 operating data, e.g., the received vehicle 100 data, the received environmental data, etc. The computer 110 may be programmed to determine the MRC based on a table, e.g., Table 2, which includes relationships between (i) the MRCs and (ii) the DTCs and the vehicle 100 operating data.

Next, in a decision block 255, the computer 110 determines whether an instruction is received from a remote computer 160. A received instruction may for example include a cancellation of a previously planned trip, rerouting the vehicle 100 to a new destination, e.g., a service center, etc. If the computer 110 determines that the instruction is received from the remote computer 160, then the process 200 proceeds to a block 260; otherwise the process 200 proceeds to a block 265.

In the block 260, the computer 110 determines action(s) based on the identified MRC and the received instruction. In one example, the computer 110 may be programmed to receive location coordinates of a service center location from the remote computer 160, and to determine actions, e.g., reducing speed, turn on hazard lights and rerouting to the service center, based on the MRC and the received location coordinates of the service center.

In the block 265, the computer 110 determines action(s) based on the identified MRC. For example, the computer 110 may be programmed to identify actions based on restrictions associated with the identified MRC, as shown in the examples of Table 1.

Following the blocks 260 and 265, in a block 270, the computer 110 performs the determined actions. The computer 110 may be programmed to perform the actions by actuating the vehicle 100 actuators 120 including propulsion, steering, braking, lights, etc.

Following the block 270, the process 200 ends, or alternatively returns to the decision block 205, although not shown in FIGS. 2A-2B.

Figure 3:
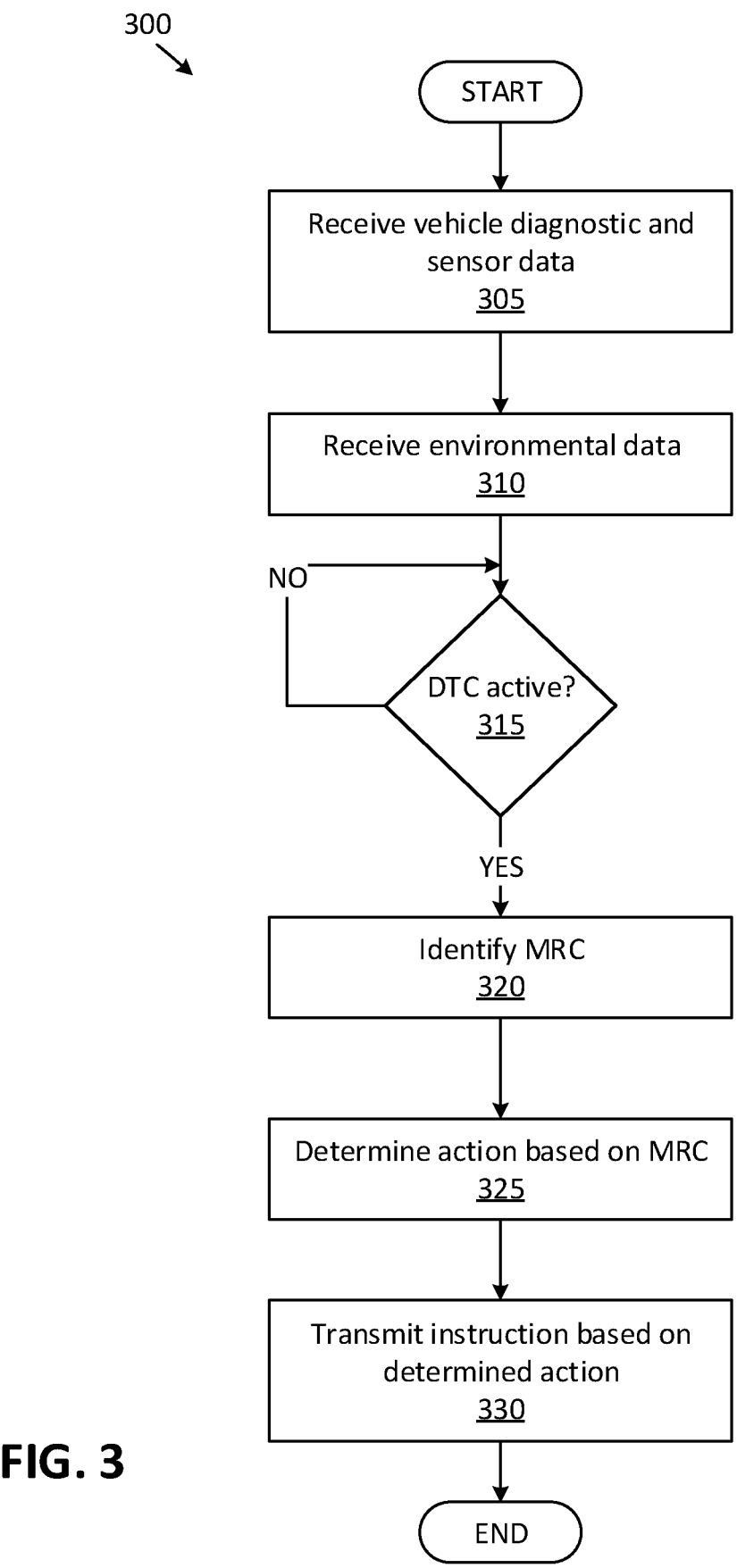
FIG. 3 is a flowchart of an exemplary process for controlling multiple vehicles remotely.

FIG. 3 is a flowchart of an exemplary process 300 for operating multiple vehicles remotely. The remote computer 160 may be programmed to execute blocks of the process 300.

The process 300 begins in a block 305, in which the remote computer 160 receives diagnostic data and sensor 130 data from one or more vehicles 100. The remote computer 160 may be programmed to receive periodically, e.g., every 50 ms, the vehicle 100 diagnostic data, e.g., change of status of a DTC, and data from vehicle 100 sensors 130, e.g., acceleration sensor 130, speed sensor 130, etc.

Next, in a block 310, the remote computer 160 receives environmental data, e.g., from a weather stations communicating with the remote computer 160 via a wired and/or wireless communication network 170. The received environmental data may include precipitation rate, temperature, etc.

Next, in a decision block 315, the remote computer 160 determines whether one or more DTCs are active (i.e., a status of the DTC is active). If the remote computer 160 determines that a DTC is active, the process 300 proceeds to a block 320; otherwise the process 300 returns to the decision block 315.

In the block 320, the remote computer 160 identifies an MRC associated with the vehicle 100 with active DTCs. The remote computer 160 may be programmed to determine the MRC based on the detected DTC, the received environmental data, and/or the received vehicle 100 sensor 130 data, e.g., using relationships stored in a table such as Table 2.

Next, in a block 325, the remote computer 160 determines an action based on the identified MRC. The remote computer 160 may be programmed to determine actions associated with a vehicle 100 identifier. For example, the remote computer 160 may be programmed to determine a first action for a first vehicle 100 with a first risk condition and a second action for a second vehicle 100 with a second risk condition. Additionally or alternatively, the remote computer 160 may be programmed to determine an action for a second vehicle 100 without a fault condition to be dispatched to a location of a first vehicle 100 with a fault condition. For example, the remote computer 160 may be programmed to dispatch a second vehicle 100 upon determining that the first vehicle 100 has an $MRC_2$ or $MRC_3$ which results in stoppage on a road side.

Next, in a block 330, the remote computer 160 transmits instructions to execute the determined action(s) to the vehicle 100. The remote computer 160 may be programmed to transmit the instruction including an identifier of the vehicle 100 which is expected to execute the received instruction. Following the block 330, the process 300 ends, or alternatively returns to the block 305, although not shown in FIG. 3.

Unless indicated explicitly to the contrary, "based on" means "based at least in part on" and/or "based entirely on."

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A vehicle computer, comprising a processor and a memory,
    the memory storing instructions executable by the processor to:
    identify a risk condition based on a combination of a diagnostic trouble code (DTC), an operating condition in a vehicle, and a plurality of vehicle operating thresholds including at least one of a temperature threshold, a speed threshold, and an acceleration threshold, wherein a first risk condition is determined based on the diagnostic trouble code and a first operating condition in the vehicle and a second risk condition is determined based on the diagnostic trouble code and a second operating condition in the vehicle;
    determine an instruction for the vehicle based on the identified risk condition; and
    navigate the vehicle based on the instruction.

2. The vehicle computer of claim 1, wherein the determined instruction includes at least one of planning a route to a service station, canceling a next trip, navigating the vehicle to a nearest road side, and stopping the vehicle in a current lane.

3. The vehicle computer of claim 1, wherein the instructions to identify the risk condition further includes instructions to determine an expected time to address the risk condition based on the identified risk condition.

4. The vehicle computer of claim 1, wherein the instructions further include instructions to:
    update the risk condition based on a second DTC; and
    update the instruction based on the updated risk condition.

5. The vehicle computer of claim 4, wherein the instructions further include instructions to determine an updated expected time to address the risk condition, wherein the updated expected time to address the risk condition is a lowest of a first expected time to address the risk condition associated with the DTC and a second expected time to address the risk condition associated with the second DTC.

6. The vehicle computer of claim 1, wherein the instructions further include instructions to determine the vehicle operating condition based on data received from at least one of a vehicle speed sensor, a camera sensor, and an acceleration sensor.

7. The vehicle computer of claim 1, wherein the vehicle operating condition further includes an outside temperature, a precipitation rate, and a road surface condition.

8. The vehicle computer of claim 1, further comprising means for determining the risk condition based at least in part on a table including a plurality of relationships between (i) the risk condition, and (ii) the DTC and the vehicle operating condition.

9. The vehicle computer of claim 1, further comprising means for dispatching a second vehicle to a location of the vehicle based on the risk condition of the vehicle.

10. A vehicle computer-implemented method, comprising:
  identifying a risk condition based on a combination of a diagnostic trouble code (DTC), an operating condition in the vehicle, and a plurality of vehicle operating thresholds including at least one of a temperature threshold, a speed threshold, and an acceleration threshold, wherein a first risk condition is determined based on the diagnostic trouble code and a first operating condition in the vehicle and a second risk condition is determined based on the diagnostic trouble code and a second operating condition in the vehicle;
  determining an instruction for the vehicle based on the identified risk condition; and
  navigating the vehicle based on the instruction.

11. The vehicle computer-implemented method of claim 10, further comprising determining the vehicle operating condition based on data received from at least one of a vehicle speed sensor, a camera sensor, an acceleration sensor, an outside temperature, a precipitation rate, and a road surface condition.

12. The vehicle computer-implemented method of claim 10, further comprising determining the risk condition based at least in part on a table including a plurality of relationships between (i) the risk condition, and (ii) the DTC and (iii) the vehicle operating condition.

* * * * *